(12) United States Patent
Voegele (10) Patent No.: US 10,232,717 B2
(45) Date of Patent: Mar. 19, 2019

(54) HIGH VOLTAGE ON-BOARD NETWORK STRUCTURE FOR VEHICLES

(71) Applicant: Robert Bosch GmbH, Stuttgart (DE)

(72) Inventor: Andreas Voegele, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 57 days.

(21) Appl. No.: 14/889,061

(22) PCT Filed: Mar. 31, 2014

(86) PCT No.: PCT/EP2014/056448
§ 371 (c)(1),
(2) Date: Nov. 4, 2015

(87) PCT Pub. No.: WO2014/180606
PCT Pub. Date: Nov. 13, 2014

(65) Prior Publication Data
US 2016/0121739 A1    May 5, 2016

(30) Foreign Application Priority Data

May 6, 2013   (DE) .......... 10 2013 208 287

(51) Int. Cl.
*B60L 11/18*   (2006.01)
*H02J 3/32*   (2006.01)
*H02J 7/02*   (2016.01)

(52) U.S. Cl.
CPC ....... *B60L 11/1811* (2013.01); *B60L 11/1803* (2013.01); *B60L 11/185* (2013.01);
(Continued)

(58) Field of Classification Search
CPC .................. B60L 11/1811; H02J 3/32
(Continued)

(56) References Cited

U.S. PATENT DOCUMENTS

| | | | |
|---|---|---|---|
| 5,734,258 A | * | 3/1998 | Esser .................. H02M 3/1582 323/224 |
| 2009/0103341 A1 | | 4/2009 | Lee et al. |

(Continued)

FOREIGN PATENT DOCUMENTS

| | | |
|---|---|---|
| CN | 101729020 | 6/2010 |
| CN | 101836343 | 9/2010 |

(Continued)

OTHER PUBLICATIONS

International Search Report for Application No. PCT/EP2014/056448 dated Jan. 27, 2015 (English Translation, 2 pages).

*Primary Examiner* — Alfonzo Perez Borroto
(74) *Attorney, Agent, or Firm* — Michael Best & Friedrich LLP (57) ABSTRACT

A power supply system (2) for vehicles, comprising an electric machine (6), a DC-AC converter (8) having a DC connection and an AC connection, and an energy storage element (4) wherein the energy storage element (4) can be connected to the DC connection and the electric machine (6) can be connected to the AC connection, wherein the electric machine (6) can be operated using the energy stored in the energy storage element (4), characterised in that a DC-DC converter (14) is arranged between the energy storage element (4) and the converter (8) and an external power supply (12) can be coupled into the DC-DC converter (14) for charging the energy storage element (4) wherein the DC-DC converter (14) can be uncoupled from the converter (8) in the event of power supply.

17 Claims, 6 Drawing Sheets

(52) U.S. Cl.
CPC ....... *B60L 11/1812* (2013.01); *B60L 11/1814* (2013.01); *B60L 11/1816* (2013.01); *H02J 3/32* (2013.01); *H02J 7/022* (2013.01); *B60L 2240/36* (2013.01); *Y02E 60/721* (2013.01); *Y02T 10/7005* (2013.01); *Y02T 10/7072* (2013.01); *Y02T 10/92* (2013.01); *Y02T 90/121* (2013.01); *Y02T 90/127* (2013.01); *Y02T 90/128* (2013.01); *Y02T 90/14* (2013.01); *Y04S 10/126* (2013.01)

(58) Field of Classification Search
USPC ........................................................ 307/10.1
See application file for complete search history.

(56) References Cited

U.S. PATENT DOCUMENTS

| | | | |
|---|---|---|---|
| 2010/0237694 A1* | 9/2010 | Fuma | B60L 11/123 307/9.1 |
| 2011/0170318 A1 | 7/2011 | Chen | |
| 2012/0112547 A1* | 5/2012 | Ghosh | H02J 9/062 307/66 |

FOREIGN PATENT DOCUMENTS

| | | |
|---|---|---|
| CN | 202557318 | 11/2012 |
| CN | 102934319 | 2/2013 |
| EP | 2179882 | 4/2010 |

* cited by examiner

FIG. 1

PRIOR ART

PRIOR ART

HIGH VOLTAGE ON-BOARD NETWORK STRUCTURE FOR VEHICLES

BACKGROUND OF THE INVENTION

The present invention relates to energy distribution systems in vehicles. The present invention particularly relates to a simplified design which at the same time ensures an improved actuation of an electric machine of the power supply system. In addition, the present invention particularly relates to a power supply system for vehicles, in particular electric and hybrid vehicles.

On-board network topologies in electric and hybrid vehicles have at least one energy storage element for holding available, for example, electrically stored energy as well at least one drive element, such as, e.g., an electric motor or an electric machine as a consumer of the stored energy for driving the vehicle. In this connection, an energy storage element, a high voltage accumulator or, respectively, battery system, is connected to the electric machine using an inverter or a DC-AC converter and is designed to emit a DC voltage. In so doing, the converter converts the DC voltage delivered from the energy storage element into an AC voltage suitable for the operation of the motor element, respectively the electric machine.

Figure 1:
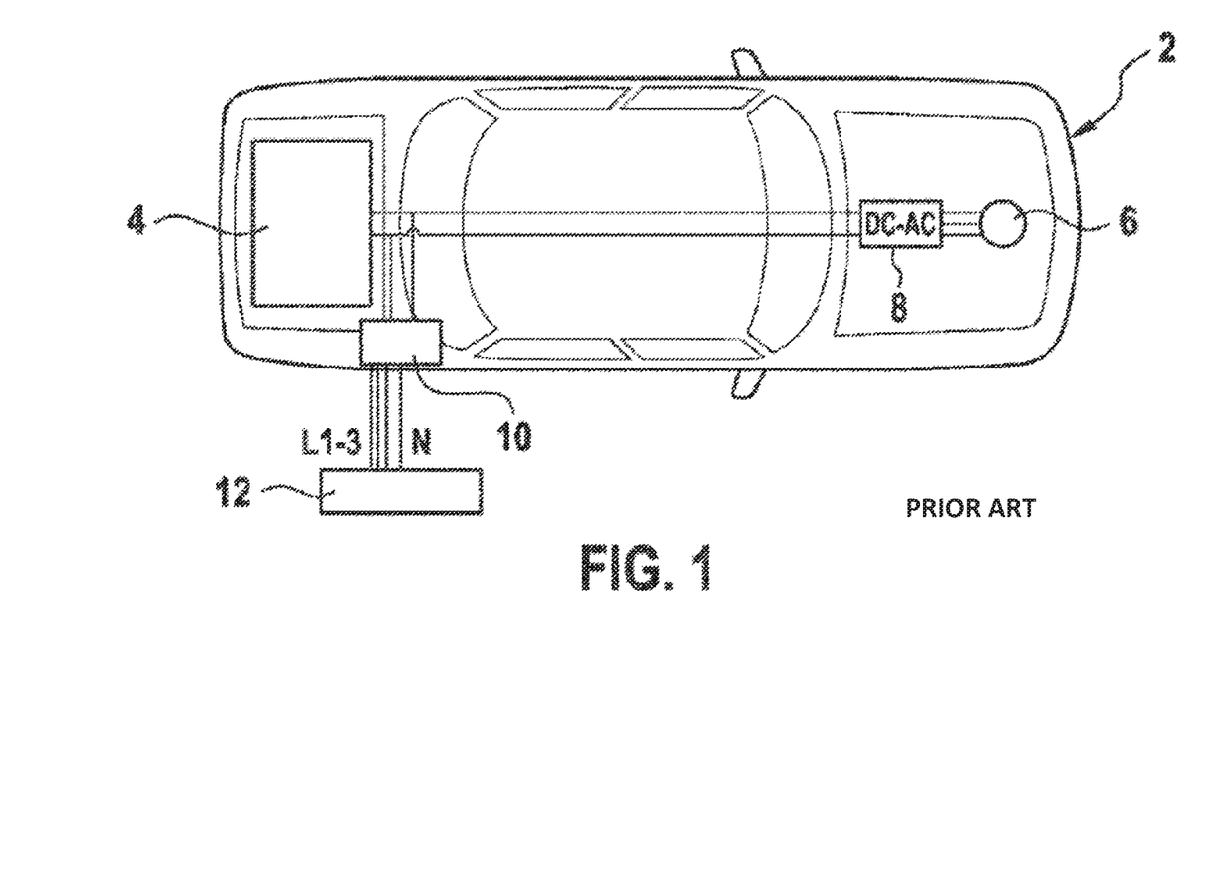
FIG. 1 shows an exemplary embodiment of a power supply system for electric or hybrid vehicles.

FIG. 1 shows a conventional on-board network structure for electric or hybrid vehicles. The inverter or, respectively, DC-AC converter is disposed in the conductive path from the energy storage element 4 to the electric motor or electric machine 6. The power supply system 2 furthermore has a charging device 10 which, on the one hand, is coupled to the power supply system and, on the other hand, is coupled to an external energy source 12, such as, for example, an electric power grid 12. In an exemplary manner, the electric power grid 12 is coupled to the charging device with the use of three phases L1-3. Other connections between the electric power grid 12 and the charging device 10 are conceivable. The charging device 10 is thereby equipped to charge the energy storage element 4 due to the external energy supply 12.

Figure 2:
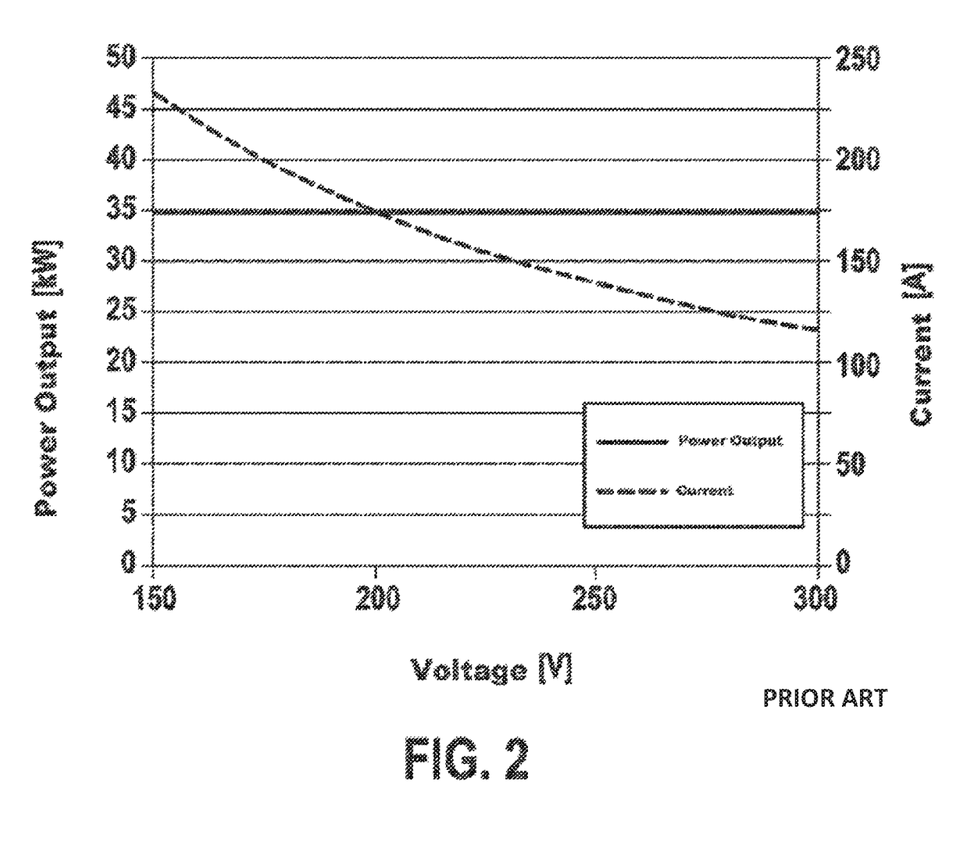
FIG. 2 shows a profile of the current flow provided by the energy storage element as a function of the terminal voltage of the energy storage element.

Conventional energy storage elements 4 generally have a variable terminal voltage which is dependent on the charging state and which is also applied to the converter 8 via the internal wiring of the energy storage system 2. FIG. 2 depicts an exemplary profile of the current flow provided by the energy storage element 4 as a function of the terminal voltage of the energy storage element 4. Because the output power of the energy storage element 4, as depicted in FIG. 2, is substantially constantly independent of the terminal voltage, a lower terminal voltage requires a higher current flow and vice versa.

In the case of a directly connected DC-AC converter 8, said converter must therefore be dimensioned in such a way that it is able to process the highest possible as well as the lowest possible voltage and the highest possible current as well as the lowest possible current.

The electrical power which is thereby converted by the DC-AC converter 8 is substantially limited by the current which, independently of the terminal voltage applied, may not exceed a certain value. The converter 8 must therefore be designed to handle this maximum current.

In order to now be able to optimally provide a converter, a DC-DC converter 14 can be provided between the energy storage element 4 and the DC-AC converter 8. As a result, the variable voltage emitted by the energy storage element 4, by way of example in the range of 150 V to 300 V, can be transformed or, respectively, converted to a voltage level which is substantially constant, for example 400 V. The DC-AC converter 8 can thus be designed to substantially assume a defined operating working point consisting of current flow and voltage without being designed for a large current range. In other words, by means of the defined voltage in the intermediate circuit between the DC-DC converter 14 and the DC-AC converter 8 due to the substantially constant power output, the associated current flow is also set to a substantially constant value. The DC-AC converter 8 preferably can now be designed for this value, without thereby having to take into account reserves for a possibly raised current with a reduced voltage. The DC-AC converter 8 or inverter therefore operates substantially at constant voltage ratios. This is intended to ensure that the current carrying capacity of the semiconductors in the converter 8 can be cut in half. All input parameters can accordingly be configured to a considerably smaller voltage and current range. As a result, the complexity of design can be reduced and material costs can be saved.

Figure 4:
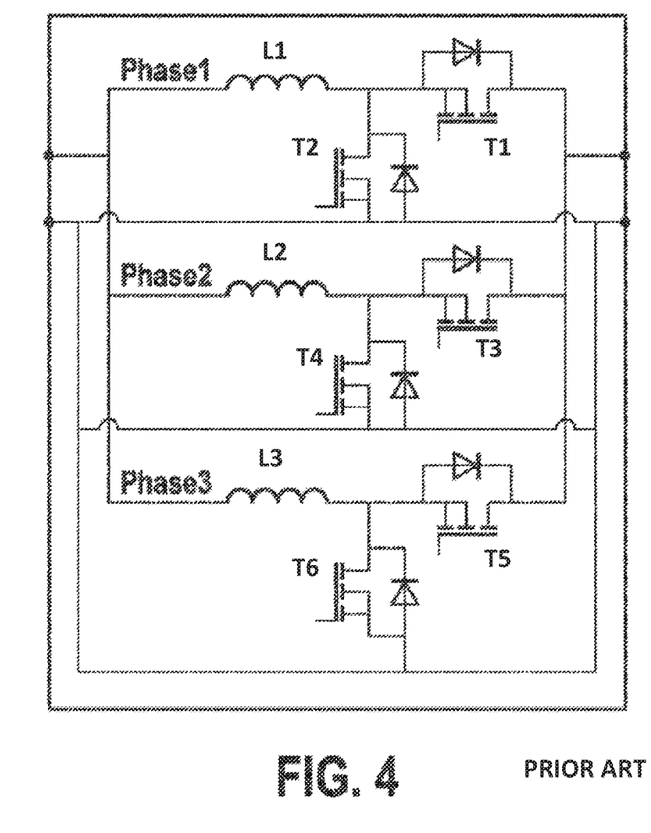
FIG. 4 shows an exemplary embodiment of a DC-DC converter.

An exemplary implementation of a DC-DC converter is shown in FIG. 4. As illustrated in FIG. 4, the DC-DC converter includes inductors L1-L3 and transistor switches T1-T6. The direct current converter 14 or, respectively, DC-DC converter 14 has exemplarily a design as a multi-phase system and thus constitutes a composite of a plurality of individual voltage converters. Technical advantages, such as, for example, the reduction of voltage and current ripples ensue from such a design.

Figure 3:
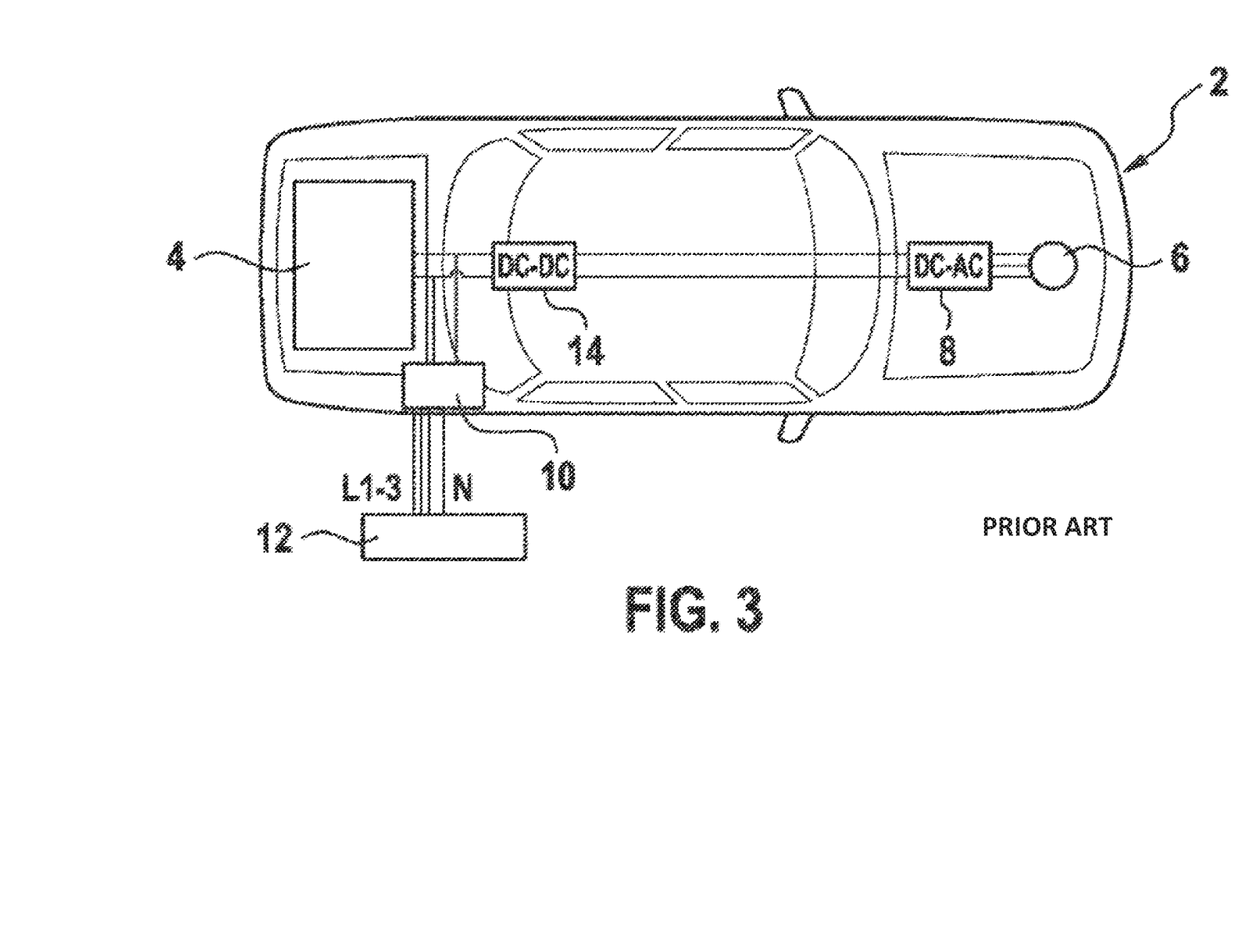
FIG. 3 shows a further exemplary embodiment of a power supply system.

Such a DC-DC converter 14, used according to FIG. 3, is, however, an additional component in the power supply system of a vehicle, which itself has a certain energy consumption and also, already alone on the basis of the weight thereof, has an increased energy requirement for driving a vehicle. Provision is further conventionally made for a charging device 10 which couples an external energy supply 12 into the power supply system such that the energy storage element 4 can be charged.

If a conventional on-board network (cf. FIG. 1) comprising a DC-DC converter for providing a constant supply voltage to the converter is therefore enhanced (cf. FIG. 3), the number of components and therefore the number of semiconductors and the actuators thereof are increased.

SUMMARY OF THE INVENTION

One aspect of the present invention is to provide an on-board network structure or a power supply system for vehicles which, on the one hand, operates a converter or inverter with a substantially constant voltage but at the same time provides an improved connection of the components of the power supply system and a simplified design. The number of semiconductors and the actuators thereof are not to be substantially increased.

A power supply system is accordingly specified for vehicles as well as for a vehicle, in particular an electric hybrid vehicle according to the independent claims. Preferred embodiments of the invention ensue from the dependent claims.

According to the invention, the DC-DC converter is modified such that substantially a charging device can be omitted which normally would also be disposed in the vehicle. The DC-DC converter, as it is used in the power supply system according to the invention, thus enables, during a charging operation, directly the feed of an (e.g. 3-phase) external energy source for charging the energy storage element, whereas said DC-DC converter can provide a substantially constant operating voltage or supply voltage to the DC-AC converter during vehicle operation. As a result, a power supply system for vehicles can be provided in which the charging function of the energy storage element is integrated into the DC-DC converter and thus a DC-AC converter can be used which is optimized to a small voltage range.

According to the invention, a DC-DC converter comprising a charging function is exemplarily constructed with a phase number of three or more phases. In a normal driving operation or also a forward operation, the phases are then connected to the intermediate circuit, to which the DC-AC converter is also connected or, respectively, which intermediate circuit feeds the converter, via safeguarding devices or, respectively, switches which are thereby closed. Due to the external energy source not being connected respectively activated, the DC-DC converter therefore has substantially a through-connected structure.

If the energy storage element is now charged, the switches are opened and an exemplary 3-phase power grid or energy source is connected directly to the DC-DC converter, which now in a reverse operation operates as a charging device or inverter and provides the energy storage element or vehicle battery with a constant charging voltage or charging current.

A converter provided in the vehicle can thus be optimized for a narrow input voltage range, which also results in advantages with regard to costs and volumes. No additional components are required for a charging device because the functionality of the DC-DC converter has been assumed.

The voltage converter is generally on account of recuperation, i.e. the energy recovery in the driving operation, configured as a bidirectional converter; thus enabling the energy of the energy storage element to also be fed back into the external energy source, e.g. a power grid. A multiplicity of power supply systems according to the invention can thus provide an energy storage solution for a regional or national energy system.

DC-DC converters according to the invention can thus be optimized for a plurality of usage scenarios, for example for those in the low power range with a long charging time without active cooling or also as high power converters for a fast charge with active cooling.

The power supply system according to the invention is likewise equipped during a recuperation operation to process energy recovered from the electric machine, for example as a result of a decelerated descent down a mountain, and feed said energy back into the energy storage element.

BRIEF DESCRIPTION OF THE DRAWINGS

Embodiments of the invention are depicted in the drawings and explained in greater detail in the following description.

In the drawings.

DETAILED DESCRIPTION

Figure 5:
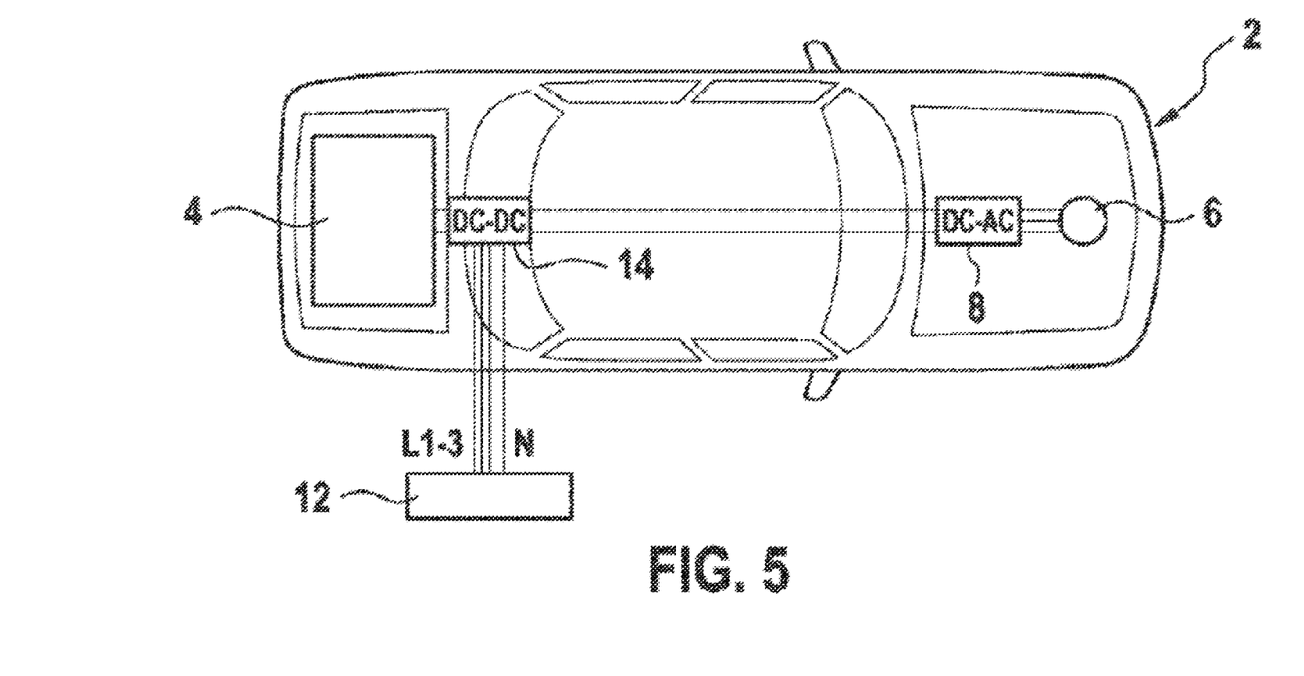
FIG. 5 shows an exemplary embodiment of an power supply system according to the present invention.

An exemplary the embodiment of a power supply system according to the present invention is depicted with reference to FIG. 5.

An energy storage element 4 is connected via an intermediate circuit to a DC-AC converter 8 or, respectively, inverter 8 which in turn is connected to the electric machine 6, e.g. an electric motor. Depending on the state of charge, the energy storage element 4 emits (see by analogy FIG. 2) a varying or variable terminal voltage to the DC-DC converter 14, which in turn feeds the intermediate circuit. By way of example, the energy storage element 4 can, for example, provide a variable voltage in the range of 150 to 300 V to the DC-DC converter 14, whereas said DC-DC converter can, by way of example, couple 400 V or another design related DC voltage into the intermediate circuit and thereby provide it to the DC-AC converter 8. The converter 8 can therefore be optimized to this substantially narrow voltage and current range. Said converter 8 subsequently provides the electric machine 6 with an AC voltage for the operation thereof.

An external energy source 12, by way of example an electric power grid 12 with 3 phases L1-3 as well as a neutral conductor N, is connected directly to the DC-DC converter 14, in particular without an interconnected, separate charging device.

Figure 6:
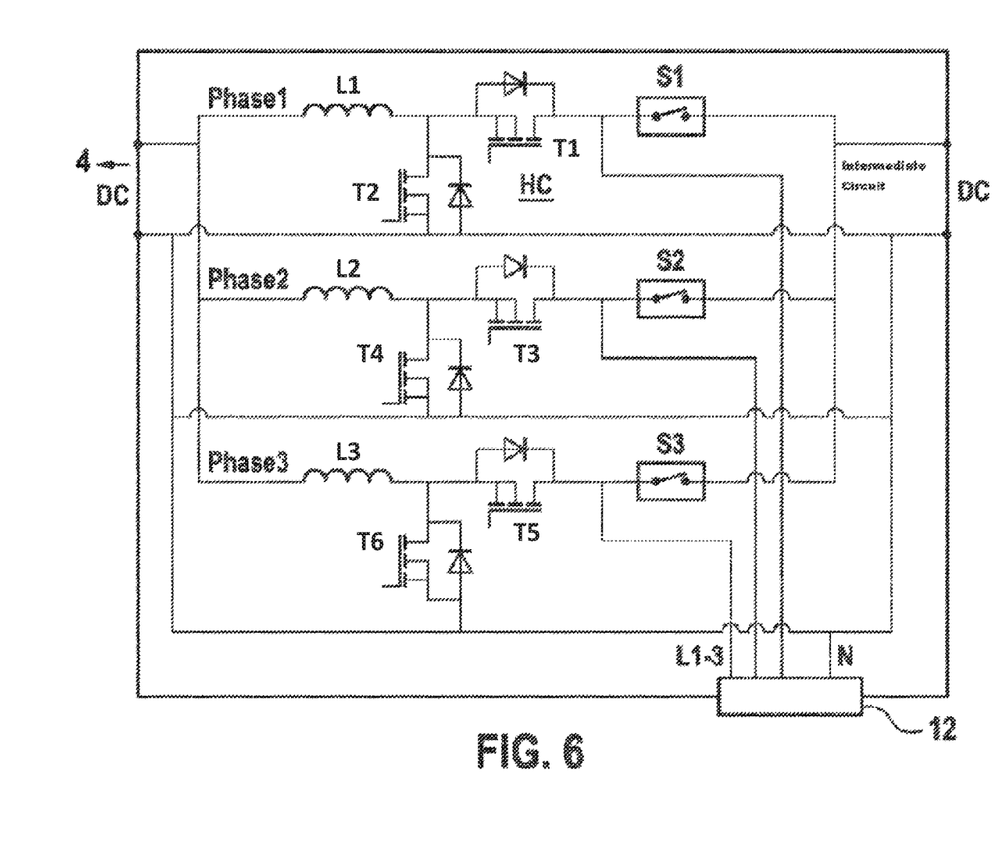
FIG. 6 shows an exemplary embodiment of a DC-DC converter according to the present invention.

An exemplary embodiment of a DC-DC converter according to the present invention is depicted with reference to FIG. 6. As illustrated in FIG. 6, the Dc-DC converter may include inductors L1-L3 and transistor switches T1-T6.

FIG. 6 shows the direct coupling of the three phases L1-3 of the external energy source 12 into the DC-DC converter 14. Said DC-DC converter is exemplarily designed, dependent on the operating direction, in the forward operation or driving operation as a step-up converter and in the reverse operation or charging operation as a step-down converter or buck converter. By way of example, FIG. 6 represents a so-called two-quadrant converter in which, on the left side thereof as depicted in FIG. 6, a voltage is provided which is less than or equal to the right side thereof, wherein a current flow is possible in both directions. The use of a 4-quadrant converter is also conceivable.

The external energy source is substantially connected directly into the phases which are disposed at the intermediate circuit, wherein the intermediate circuit is, however, decoupled from the DC-DC converter 14 via switching elements S1-3. The external source 12 thus substantially "sees" the DC-DC converter 14 as a step-down converter when feeding the energy and thereby charges the energy storage element 4. This constitutes the charging operation or reverse operation.

An external energy source 12 is generally no longer connected to the DC-DC converter 14 in a forward operation or driving operation, a charging cable is, for example, unplugged, while the switching elements S1-3 are in a closed state. As a result, the DC-DC converter constitutes a step-up converter operation as seen from the energy storage in the direction of the electric machine 6 and thereby provides the intermediate circuit a substantially constant operating voltage or supply voltage for the converter 8 via the closed switching elements S1-3.

The embodiment of the inventive DC-DC converter 14 depicted in FIG. 6 is particularly to be seen as a basic schematic diagram of a direct voltage converter respectively DC-DC converter or also DC-DC charger. A concrete implementation can result on the basis of a required embodiment of the individual components or, respectively, of the entire power supply system.

The invention claimed is:

1. A power supply system for a vehicle, comprising:
   an electric machine;
   a DC-AC converter having a DC connection and an AC connection; and
   an energy storage element;
   wherein the energy storage element is configured to be connected to the DC connection and the electric machine can be connected to the AC connection;
   wherein the electric machine can be operated using energy stored in the energy storage element;
   a DC-DC converter arranged between the energy storage element and the DC-AC converter, wherein the DC-DC converter is configured to operate in a forward operating direction during a driving operation of the vehicle and to operate in a reverse operating direction during a charging operation for the energy storage element; and
   an external power supply configured to be coupled into the DC-DC converter for charging the energy storage element;
   wherein during the charging operation the DC-DC converter is decoupled from the DC-AC converter and the DC-DC converter operates as a charging device that provides a constant charging voltage or charging current from the external power supply to the energy storage device.

2. The power supply system according to claim 1, further comprising:
   at least one switching element for coupling or decoupling the DC-DC converter to and from the DC-AC converter;
   wherein the switching element is in a decoupled or open state in the event of external energy supply and the switching element is in a coupled or, respectively, closed state during operation or, respectively, vehicle operation.

3. The power supply system according to claim 1, wherein the external power supply takes place by a coupling of the power supply system to the electric power grid.

4. The power supply system according to claim 3, wherein the power supply system is equipped, when coupled to an external electric power grid, to hold energy stored in the energy storage element available to be delivered to the electric power grid.

5. The power supply system according to claim 1, wherein the external power supply is designed at least as a 2-phase system, and
   wherein the DC-DC converter has a quantity of phases which is equal to or greater than the number of phases of the external power supply.

6. The power supply system according to claim 1, wherein the DC-DC converter is designed as a 3-phase system and wherein the external power supply is equipped with three phases.

7. The power supply system according to claim 1, wherein the DC-DC converter is equipped to provide a non-constant voltage of the energy storage element as a substantially constant voltage to the converter.

8. The power supply system according to claim 1, wherein energy recovered by the electric machine can be stored in the energy storage element during vehicle operation.

9. An electric or hybrid vehicle comprising a power supply system according to claim 1.

10. The power supply system according to claim 1, wherein the DC-DC converter is a bidirectional converter configured to supply recovered energy of the energy storage element back to the external power supply, wherein the recovered energy is recovered during a driving operation of a vehicle.

11. The power supply system according to claim 1, wherein the DC-DC converter is configured as a step-up converter when the DC-DC converter operates in the forward operating direction and wherein the DC-DC converter is configured as a step-down converter when the DC-DC converter operates in the reverse operating direction.

12. The power supply system according to claim 1, wherein the DC-DC converter is configured as a two-quadrant converter having a left quadrant and a right quadrant, wherein the left quadrant provides a voltage that is less than or equal to a voltage provided by the right quadrant, and wherein a current can flow through the DC-DC converter in either a reverse direction or a forward direction.

13. The power supply system according to claim 1, wherein the DC-DC converter is equipped to provide an AC voltage for operation of the electric machine.

14. The power supply system according to claim 1, further comprising:
   a plurality of switching elements configured to couple or decouple the DC-DC converter to and from the DC-AC converter,
   wherein each of the plurality of switching elements are opened during the charging operation and each of the switching elements are closed during the driving operation.

15. The power supply system according to claim 1, further comprising:
   an intermediate circuit, wherein the intermediate circuit is decoupled from the DC-DC converter via the plurality of switching elements.

16. The power supply system according to claim 1, further comprising:
   a first switching element configured to connect a first phase to the DC-AC converter when the first switching element is closed;
   a second switching element configured to connect a second phase to the DC-AC converter when the second switching element is closed; and
   a third switching element configured to connect a third phase to the DC-AC converter when the third switching element is closed.

17. The power supply system according to claim 1, wherein the DC-DC converter includes at least three switching elements configured to couple and decouple the DC-DC converter from the DC-AC converter.

* * * * *